US012389819B1

(12) United States Patent
Zhang et al.

(10) Patent No.: US 12,389,819 B1
(45) Date of Patent: Aug. 19, 2025

(54) METHOD FOR NEAR-NATURAL LONG-TERM BREEDING OF ECONOMIC CROPS IN WETLAND BY USING RETURNED FARMLAND

(71) Applicant: Northeast Institute of Geography and Agroecology, Chinese Academy of Sciences, Changchun (CN)

(72) Inventors: Mingye Zhang, Changchun (CN); Shouzheng Tong, Changchun (CN); Ming Jiang, Changchun (CN); Guodong Wang, Changchun (CN); Yu An, Changchun (CN); Geng Cui, Changchun (CN)

(73) Assignee: Northeast Institute of Geography and Agroecology, Chinese Academy of Sciences, Changchun (CN)

( * ) Notice: Subject to any disclaimer, the term of this patent is extended or adjusted under 35 U.S.C. 154(b) by 0 days.

(21) Appl. No.: 18/978,211

(22) Filed: Dec. 12, 2024

(30) Foreign Application Priority Data

May 27, 2024 (CN) .......................... 202410657766.0

(51) Int. Cl.
*A01B 79/00* (2006.01)
*A01C 1/02* (2006.01)
*A01C 14/00* (2006.01)
*A01G 22/00* (2018.01)
*A01G 24/25* (2018.01)

(52) U.S. Cl.
CPC ................ *A01B 79/00* (2013.01); *A01C 1/02* (2013.01); *A01C 14/00* (2013.01); *A01G 22/00* (2018.02); *A01G 24/25* (2018.02)

(58) Field of Classification Search
CPC ........ A01G 22/00; A01G 33/00; A01B 79/00; A01C 1/00; A01C 1/06; A01C 1/08; A01C 14/00; A01C 21/00; A01C 21/005
USPC ...................................... 47/58.1 SC
See application file for complete search history.

(56) References Cited

FOREIGN PATENT DOCUMENTS

| CN | 106358655 | A | * | 2/2017 | |
|---|---|---|---|---|---|
| CN | 109042124 | A | * | 12/2018 | |
| CN | 109076894 | A | * | 12/2018 | ............... A01C 1/00 |
| CN | 110268907 | A | * | 9/2019 | ........... A01G 17/005 |
| CN | 110959470 | A | * | 4/2020 | |
| CN | 113261463 | A | * | 8/2021 | ............. A01B 79/00 |
| CN | 113498724 | A | * | 10/2021 | |
| CN | 117441676 | B | * | 3/2024 | |

(Continued)

OTHER PUBLICATIONS

Singh et al., "Integrated Aquaculture with Fox Nut—A Case Study from North Bihar, India", Oct. 2017, International Journal of Current Microbiology and Applied Sciences, vol. 6 No. 10 (2017), pp. 4906-4912 (Year: 2017).*

(Continued)

*Primary Examiner* — Kimberly S Berona
*Assistant Examiner* — Erica Michelle Huebner
(74) *Attorney, Agent, or Firm* — Piloff Passino & Cosenza LLP; Rachel Piloff; Sean Passino

(57) ABSTRACT

A method for near-natural long-term breeding of economic crops in a wetland by using a returned farmland is provided, including the following steps: S1, selecting site of the returned farmland and restoring landform; S2, performing germplasm improvement treatment of *Euryale ferox*; S3, controlling sowing of the *Euryale ferox* seeds; and S4, germplasm improvement and ecological conservation.

7 Claims, 3 Drawing Sheets

(56) References Cited

FOREIGN PATENT DOCUMENTS

CN        117813960 A    4/2024
JP        2013014496 A   1/2013

OTHER PUBLICATIONS

Kumar et al., "Optimization of Seed Germination in Makhana (*Euryale ferox* Salisb.) Under Controlled Conditions", Mar. 2017, HortFlora Research Spectrum, vol. 6 Issue 1 (2017), pp. 55-58 (Year: 2017).*
Xue et al., "Analysis of SSR Information in Aquatic Plant *Euryale ferox* Salisb Transcriptome", Mar. 7, 2023, International Journal of Aquaculture, vol. 13 No. 2 (2023) (Year: 2023).*
Retrieval report-First search dated Jul. 2, 2024 in SIPO application No. 202410657766.0.
Notification to Grant Patent Right for Invention dated Jul. 8, 2024 in SIPO application No. 202410657766.0.

* cited by examiner

METHOD FOR NEAR-NATURAL LONG-TERM BREEDING OF ECONOMIC CROPS IN WETLAND BY USING RETURNED FARMLAND

CROSS-REFERENCE TO RELATED APPLICATIONS

This application claims priority to Chinese Patent Application No. 202410657766.0, filed on May 27, 2024, the contents of which are hereby incorporated by reference.

TECHNICAL FIELD

The disclosure belongs to the technical field of wetland ecological engineering, and in particular relates to a method for near-natural long-term breeding of economic crops in a wetland by using a returned farmland.

BACKGROUND

*Euryale ferox* belongs to plants of Nymphaeaceae and *Euryale*, and the seeds of *Euryale ferox* are rich in unsaturated fatty acid linolenic acid, known as "ginseng in water" and "longan in water", which is a traditional Chinese medicine and a precious natural tonic. However, due to extreme climate change and unreasonable human development activities, the degradation of wild *Euryale ferox* wetland is getting worse and worse, which seriously threatens the local ecological security and economic production activities of *Euryale ferox*. Therefore, the implementation of long-term breeding of *Euryale ferox* has become a key scientific problem to be solved urgently in the field of wetland ecology and wetland economics.

At present, the ways of efficient breeding of *Euryale ferox* mainly include the methods of pond breeding and the addition of matrix components. Pond breeding technology has a long history and strong operability, but this kind of technology is mostly limited to artificial reconstruction of farmland, lacking the linkage with natural wetlands, and there are some problems such as competing for land and water with agricultural planting industry. The addition of matrix components may quickly increase the content of soil organic matter, thus providing sufficient nutrient sources for the growth of *Euryale ferox*. However, this method has the risk of eutrophication, and the engineering cost is high, so it is not easy to be applied in large-scale returned farmland.

Generally speaking, none of the above aspects may achieve long-term breeding of *Euryale ferox* under the background of near-natural restoration. Therefore, how to realize the long-term breeding of *Euryale ferox* by integrating hydrological connected supply, germplasm improvement and soil nutrient improvement under the premise of near-natural restoration has become a key problem to be solved urgently in the field of wetland eco-economy.

SUMMARY

The disclosure provides a method for near-natural long-term breeding of economic crops in a wetland by using a returned farmland, and aims to solve the restrictive problems of slow dehumidification efficiency of local returned farmland and low near-nature breeding efficiency of wetland economic crops at present.

The disclosure provides a method for breeding wetland economic crops in a near-natural and long-term way by using the returned farmland, including the following steps:

S1, selecting site of the returned farmland and restoring landform;

S11, selecting a returned farmland paddy field adjacent to a natural wetland as a restoration plot, excavating a soil layer of the restoration plot, and piling a ridge on the peripheral edge of the restoration plot;

S12, loosening soil for a soil in a middle part of the restoration plot, and adding reed crushed matrix into each plot and fully mixing with a loosened soil layer;

S13, excavating a V-shaped water delivery ditch with a ditch depth of 50-70 cm, and reserving water delivery outlets of 1-2 m in a staggered way on a ridge adjacent to the water delivery ditch; and S14, planting reed rhizomes at a slope of the water delivery ditch;

S2, performing germplasm improvement treatment of *Euryale ferox*: obtaining mature *Euryale ferox* seeds, and sequentially performing disinfection, low-temperature sand storage and seed soaking priming treatment on the mature *Euryale ferox* seeds;

S3, controlling sowing of the *Euryale ferox* seeds: soaking the *Euryale ferox* seeds after the germplasm improvement treatment in a water body at 31-35° C. in a continuous illumination environment for 5-10 days; evenly sowing seeds in a target plot, and keeping a seed coat break for downward cultivation; where a soil moisture content is 90-100% at an initial stage of cultivation, and a depth of surface water accumulation is kept at 10-15 cm during seedling development stage, and a depth of the surface water accumulation is kept at 70-80 cm during adult plant development stage; and S4, germplasm improvement and ecological conservation: collecting part of *Euryale ferox* seeds, where 5% of the *Euryale ferox* seeds developed in a current year are reserved for near-natural sexual breeding in the target plot, and 10% of collected *Euryale ferox* seeds are subjected to the germplasm improvement treatment; pumping out a water body in the target plot to a surface water depth of 10-20 cm, and mixing *Euryale ferox* stems with a soil with the depth of 30-40 cm for turning over.

Further, the S11 to the S13 are carried out from late March to mid-April of a year before sowing, and the S15 is carried out in mid-May of the year before sowing; the S2 is carried out from September to October of the year before sowing; the S3 is carried out from early May to early June; and the S4 is carried out from late September to mid-October of a current sowing year.

Further, the returned farmland paddy field adjacent to a natural wetland is a returned farmland paddy field 10-20 m away from an edge of a water surface of the natural wetland.

Further, contents of sodium chloride and sodium bicarbonate in a soil of the returned farmland paddy field are all lower than 30 mmol/L.

Further, the soil layer of the restoration plot is excavated to an excavating depth of 50-70 cm; and a height of the ridge is 30-50 cm.

Further, loosening soil for the soil in the middle part of the restoration plot with a depth of 20-30 cm.

Further, a mass of reed crushed matrix added in each plot is 20-30 kg.

Further, a planting density of reed rhizomes is 2-5 plants/m².

Further, in the S3, a sowing density is 45-60 seeds/m².

Further, the S2 specifically includes: sterilizing the mature *Euryale ferox* seeds with 1% potassium permanganate solution for 20-30 minutes, and performing low-temperature sand storage treatment at 2° C./6° C. variable temperature with a cycle of 12 hours in sandy soil with 50-60% water content, and after 90-110 days, performing seed soaking priming for 12 hours on the *Euryale ferox* seeds in 0.5% salicylic acid solution.

The disclosure has the following beneficial effects.

First, the method is clear in principle, easy to implement and low in cost. After the returned farmland is reconstructed based on the method of the disclosure to breed economic crops, frequent manual maintenance is not needed. In addition, the method provided by the disclosure may harvest *Euryale ferox* seeds and produce natural breeding provenances in the same year, and is suitable for popularization and application in the project of returned farmland to wetland and the development process of wetland eco-economic industry.

Second, the disclosure may effectively improve the returned farmland to wetland efficiency and ecological function of the returned farmland. According to the disclosure, the returned farmland paddy field adjacent to the natural wetland is selected as the restoration target, so that the water resources of the natural wetland may be fully utilized and the frequency conversion of hydrological rhythm may be regulated in sections, thereby effectively improving the efficiency of returned farmland to wetland. In addition, the content of the disclosure covers key measures such as matrix transformation, hydrological regulation and control, species introduction, etc., and the key components of the wetland are constructed in an all-round way, which may effectively promote the near-natural restoration of the returned farmlands in the direction of the wetland ecosystem and significantly restore the component structure and ecological function.

Third, the method provided by the disclosure may effectively improve the quality and development quantity of *Euryale ferox* germplasm. According to the disclosure, the germplasm of *Euryale ferox* is improved by low-temperature sand storage treatment and seed soaking priming, and combined with continuous seed soaking priming in warm water to promote the germination of *Euryale ferox* seeds, so that cell division of *Euryale ferox* seeds and the generation of phytochemicals-related synthetic enzymes and disease course-related proteins may be effectively promoted, thereby effectively improving the germplasm quality and germination quantity of *Euryale ferox*. In addition, according to the disclosure, different surface flooding depths are respectively set for the seed germination, seedling growth and adult plant development stages of *Euryale ferox*, which may effectively activate the expression of LEA gene and ethylene response factor TERF2 in the seedling stage, so as to realize the rapid development of *Euryale ferox* seedlings by promoting cell proliferation, and the low-oxygen escape strategy adopted in the adult plant development process will maintain the gas exchange between seedling tissues and aerobic environment, promote the rapid development of aboveground parts and the seed setting scale, thus effectively improving *Euryale ferox* seeds.

Fourth, the disclosure is safe and effective, and gives consideration to the ecological and economic benefits of wetlands. The *Euryale ferox* seed materials used in the disclosure all belong to common species in swamp wetlands and are taken from the natural wetland environment around the restoration site, so there is no risk of invasion of exotic species. Meanwhile, the wetland plants selected in the disclosure belong to economic crops, and the economic benefits are considerable by breeding *Euryale ferox* according to the patent method.

To sum up, the method of the disclosure has clear principle and strong operability, may effectively improve the restoration speed of returned farmland to moisture and the success probability of wetland economic crop cultivation, and the restoration idea is in line with the concept of near-natural restoration, and there are no engineering safety hazards and risks threatening the health of natural wetland ecosystems. By applying the method of the disclosure to transform the returned farmlands and breed economic crops in wetlands, the survival probability of economic crops may reach 95%, and the yield per unit area may reach 85-90 kg/mu (1 mu-666.67 m$^2$). The disclosure is used for long-term breeding of wetland economic crops by using the near-natural resources of returned farmland.

The disclosure is suitable for the application scene of near-natural long-term breeding of wetland economic crops by using the returned farmland wetland.

DETAILED DESCRIPTION OF THE EMBODIMENTS

In the following, the technical scheme in the embodiments of the disclosure will be described clearly and completely with the attached drawings of the disclosure. Based on the embodiments in the present disclosure, all other embodiments obtained by ordinary technicians in the field without creative labor belong to the scope of protection of the present disclosure.

Embodiment 1

This embodiment will be described with reference to FIG. 1 and FIG. 3.

Figure 3:
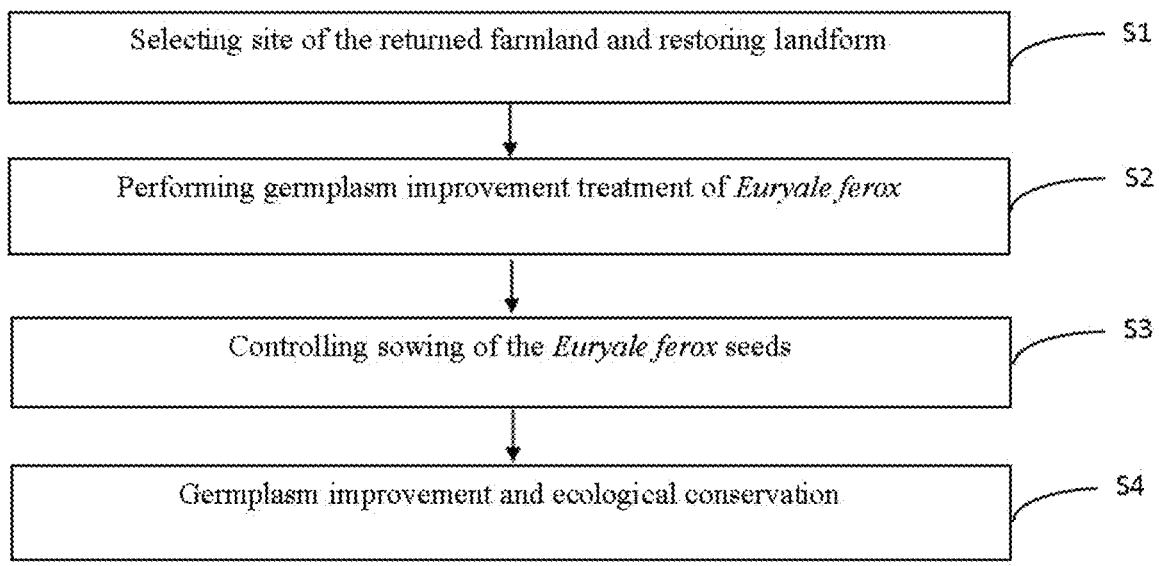
FIG. 3 is a flow chart of the steps of a method for breeding wetland economic crops in a near-natural and long-term way by using the returned farmland according to in Embodiment 1.

The method for near-natural long-term breeding of economic crops in a wetland by using a returned farmland in this embodiment includes the following steps (as shown in FIG. 3):

S1, selecting site of the returned farmland and restoring landform: from late March to mid-April, the returned farmland paddy field, which is 10-20 meters away from the edge of the water surface of the natural wetland, is selected as the restoration plot, and the contents of sodium chloride and sodium bicarbonate in the soil of returned farmland are all less than 30 mmol/L. The soil layer of the restoration plot is excavated to a depth of 50-70 cm, and part of the excavated soil layer is used to build a ridge around the restoration plot to make the height of the ridge reach 30-50 cm. The residual soil layer in the middle part of the plot (that is, the other part of the excavated soil layer) is restored to 20-30 cm underground by artificial loosening soil, and 20-30 kg of reed crushed matrix is added to each plot and fully mixed with the loosened soil layer. The water delivery ditch is excavated with "V" structure to 50-70 cm, and 1-2 meters of water delivery outlet is reserved on the ridges of the water delivery ditch adjacent to each plot in a staggered way. In mid-May, reed rhizomes are planted at the slope of water delivery ditch with the density of 2-5 plants/m$^2$. The positional relationship between the wetland, the ridge, the water delivery outlet and the restoration plot mentioned in this step is shown in FIG. 1.

S2, performing germplasm improvement treatment of *Euryale ferox*: mature *Euryale ferox* seeds are obtained from September to October one year before sowing, sterilizing is carried out with 1% potassium permanganate solution for 20-30 minutes, and low-temperature sand storage treatment is carried out at 2° C./6° C. variable temperature with a cycle of 12 hours in sandy soil with 50-60% water content, and after 90-110 days, seed soaking priming is carried out for 12 hours on the *Euryale ferox* seeds in 0.5% salicylic acid solution.

S3, controlling sowing of the *Euryale ferox* seeds: from early May to early June, the pretreated *Euryale ferox* seeds are soaked in water at 31-35° C. for 5-10 days to accelerate germination. Sowing is carried out evenly in the target plot with the density specification of 45-60 seeds/m$^2$, and the seed coat break is kept down for cultivation. The soil water content is 90-100% in the initial stage of seed cultivation of *Euryale ferox*, and the surface water depth is 10-15 cm during seedling development stage and 70-80 cm during adult plant development stage.

S4, germplasm improvement and ecological conservation: from late September to mid-October, some *Euryale ferox* seeds are collected. Wherein 5% of the *Euryale ferox* seeds developed in the current year are reserved for near-natural sexual breeding in the target plot, and 10% of the collected *Euryale ferox* seeds are used for the next year's cultivation. The water body in the target plot is pumped to the surface water depth of 10-20 cm, and the *Euryale ferox* stem is mixed with the soil with a depth of 30-40 cm by a ploughing machine.

Embodiment 2

This embodiment is a further illustration of the method for near-natural long-term breeding of economic crops in a wetland by using a returned farmland according to Embodiment 1.

S1, selecting site of the returned farmland and restoring landform

From late March to mid-April, the returned farmland paddy field adjacent to natural wetlands is selected as the target plot, and the restoring landform is carried out by using the remaining ridges and water delivery ditches.

It is required that the linear distance between the target restoration plot and the edge of the natural wetland surface is 10-20 meters, so as to make use of natural water resources to carry out hydrological regulation and management.

The content of sodium chloride and sodium bicarbonate in the soil of the target plot is required to be lower than 30 mmol/L to avoid the secondary stress caused by soil salinization.

It is required to excavate the soil in the middle of the abandoned ridge to a depth of 50-70 cm, and the soil is piled to the surrounding abandoned ridge to make the piling height be 30-50 cm, thus creating a negative terrain environment suitable for the growth and development of *Euryale ferox*.

It is required to manually loosening soil in the middle part of the ridge to 20-30 cm underground, and 20-30 kg reed crushed matrix is added to each block and mixed with the loosened soil layer fully to improve the physical structure and organic matter content of the soil.

It is required to dig the water delivery ditch with "V" structure to a depth of 50-70 cm to keep the same depth as the target plot.

It is required to reserve water delivery outlets of 1-2 m in a staggered way at the piled ridges adjacent to the main water delivery ditch to connect with the water delivery ditch, so as to facilitate the water transportation and regulation management among the plots.

It is required to plant reed rhizomes at the slope of water delivery ditch in mid-May with the density of 2-5 plants/m$^2$, so as to build a living ditch and prevent soil erosion.

S2, *Euryale ferox* seed germplasm improvement treatment

Mature *Euryale ferox* seeds are obtained from September to October one year before sowing, and low-temperature sand storage and seed soaking priming treatment are carried out to improve germplasm quality.

Seeds are required to be soaked in 1% potassium permanganate solution for 20-30 minutes before low-temperature sand storage for disinfection.

It is required that the water content of sandy soil should be 50-60% in the process of low-temperature sand storage, so as to improve the permeability of seed coat and break the physical dormancy.

It is required to carry out 2° C./6° C. variable temperature dark treatment with a cycle of 12 hours to promote hypocotyl development and break physiological dormancy.

The low-temperature sand storage of seeds is required to last for 90-110 days to ensure that the compound dormancy is broken.

It is required that the seeds of *Euryale ferox* after low-temperature sand storage should be washed and soaked with 0.5% salicylic acid solution for 12 hours, so as to promote cell division and the phytochemicals-related synthetic enzymes and the related synthetases and disease course-related proteins, thus improving the germination probability and stress resistance of the seeds.

S3, controlling sowing of the *Euryale ferox* seeds

From early May to early June, the pretreated seeds of *Euryale ferox* are soaked and germinated, and then planted, and targeted water supplement is carried out in seedling development period and plant growth period respectively.

It is required to soak seeds in a continuous light environment to accelerate germination and keep the water body temperature at 31-35° C.

It is required to keep soaking seeds for 5-10 days to ensure the full extension of *Euryale ferox* seeds and embryos.

It is required to sow evenly in the target plot with the density of 45-60 seeds/m$^2$, and to keep the seed coat break down for cultivation.

It is required to keep the soil water content at 90-100% in the initial stage of seed cultivation, and the depth of surface water accumulation during the seedling development stage of *Euryale ferox* is 10-15 cm, and the depth of surface water accumulation during the adult plant development stage of *Euryale ferox* is 70-80 cm.

S4, germplasm improvement and ecological conservation

From late September to mid-October, some seeds of *Euryale ferox* are collected, and the water level of the target plot is regulated, and the stems of *Euryale ferox* are wetted by a ploughing machine.

It is required to keep 5% of *Euryale ferox* seeds developed in the current year in the target plot for near-natural sexual reproduction.

It is required that 10% of the collected mature seeds of *Euryale ferox* should be treated with low-temperature sand storage, seed soaking priming treatment and other treatments to improve the germplasm, so as to provide high-quality provenance for the subsequent cultivation of *Euryale ferox* crops.

It is required to set up a water pump between the target plot and the natural wetland to pump away the water, and the surface water depth is kept to be 10-20 cm.

It is required to use ploughing machinery to enter the target plot to mix and turn the *Euryale ferox* stems with the soil with a depth of 30-40 cm at the bottom, so as to speed up the input of soil nutrients in the target plot and promote its near-natural recovery.

Embodiment 3

This embodiment will be described with reference to FIG. 1.

This embodiment is a further illustration of the method for near-natural long-term breeding of economic crops in a wetland by using a returned farmland according to Embodiment 1 and Embodiment 2.

S1, selecting site of the returned farmland and restoring landform

On Mar. 29, 2023, two fallow farmland paddy fields (2 mu in total) were selected as target restoration plots in the periphery of wetland along the Yangtze River in Momoge National Nature Reserve, Jilin Province. All plots are adjacent to natural wetlands, and the linear distance is between 15-18 meters. The contents of sodium bicarbonate in the soil of the two fallow farmland are 18 mmol/L and 16 mmol/L, and a 1-meter-wide water delivery ditch is reserved between the two plots.

On Apr. 12, 2023, an excavator was used to dig the middle part of the target plot to a depth of minus 60 cm, and the excavated soil was piled up to a height of 45 cm above the ridge around the plot. After manually loosening soil is carried out on the soil with a depth of 25 cm in the middle part of the plot, 20 kg of reed crushed matrix was added and fully mixed, and the main water delivery canal was dug to a depth of 60 cm with a "V" structure, and at the same time, at each block adjacent to the ridge of the water delivery ditch, 2 meters of water inlets and outlets were dug in a staggered way. On May 1, 2023, the water pump was used to fill the water delivery ditch, so that the soil moisture content in the target plot was kept at 95%. On May 17, 2023, reed rhizomes were planted at the slope of water delivery ditch with the density of 4 plants/m$^2$.

S2, *Euryale ferox* seed germplasm improvement treatment

On Sep. 29, 2022, the mature seeds of *Euryale ferox* were collected in the wetland of Momoge National Nature Reserve in Jilin Province. The collected seeds were disinfected in 1% potassium permanganate solution for 20 minutes after removing the external floating skin, and then cleaned and placed in a sterile operation table for later use. The river sand was washed and sterilized at high temperature at 160° C. After cooling, pure water was added to 55% water content. The seeds of *Euryale ferox* were fully mixed with sand at a ratio of 1:5, and then stored in a dark environment with a cycle of 12 hours at 2° C./6° C. for 100 days. After low-temperature sand storage, the seeds of *Euryale ferox* were washed and placed in 0.5% salicylic acid solution for 12 hours.

Figure 1:
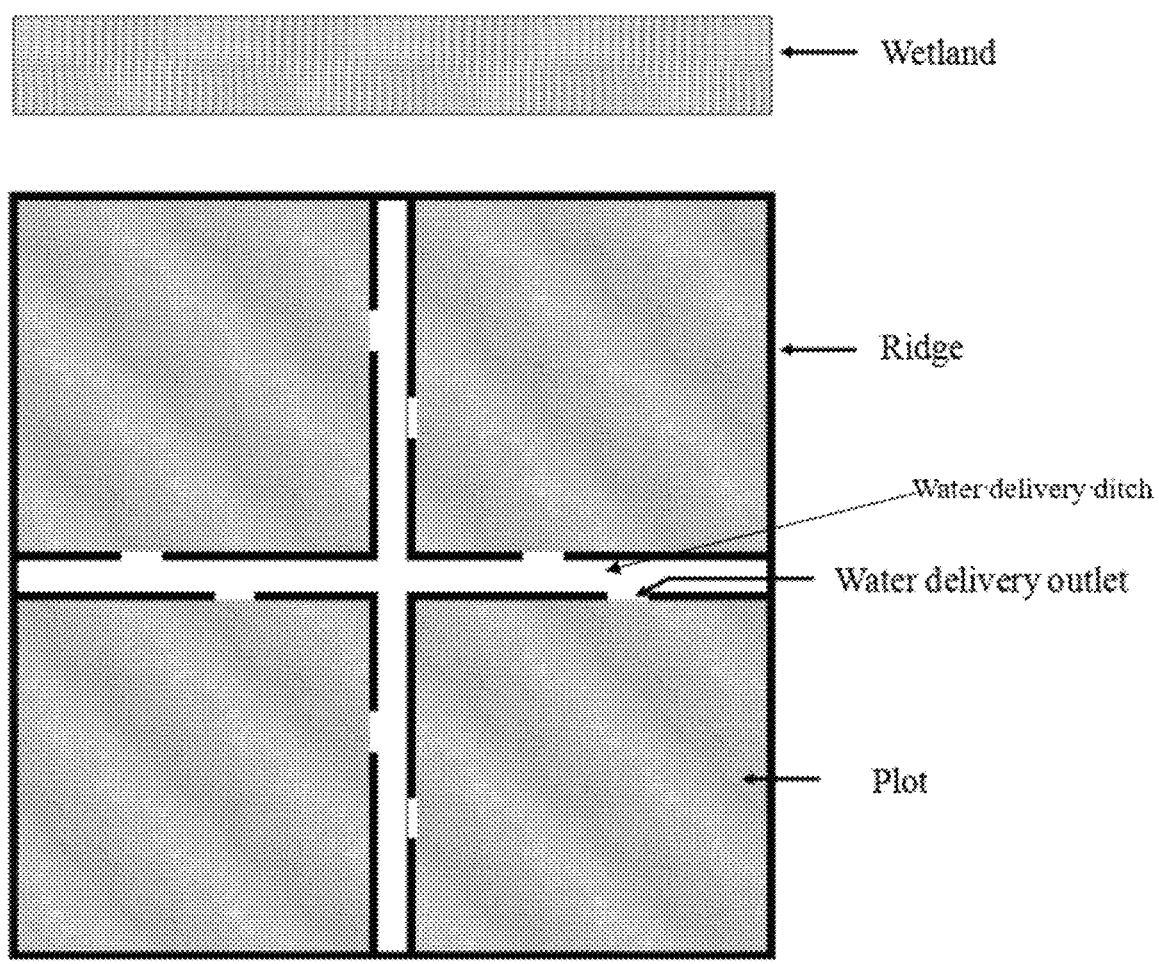
FIG. 1 is a schematic diagram of the positional relationship among wetlands, ridges, water delivery outlets and restoration plots according to Embodiment 1.
Figure 2:
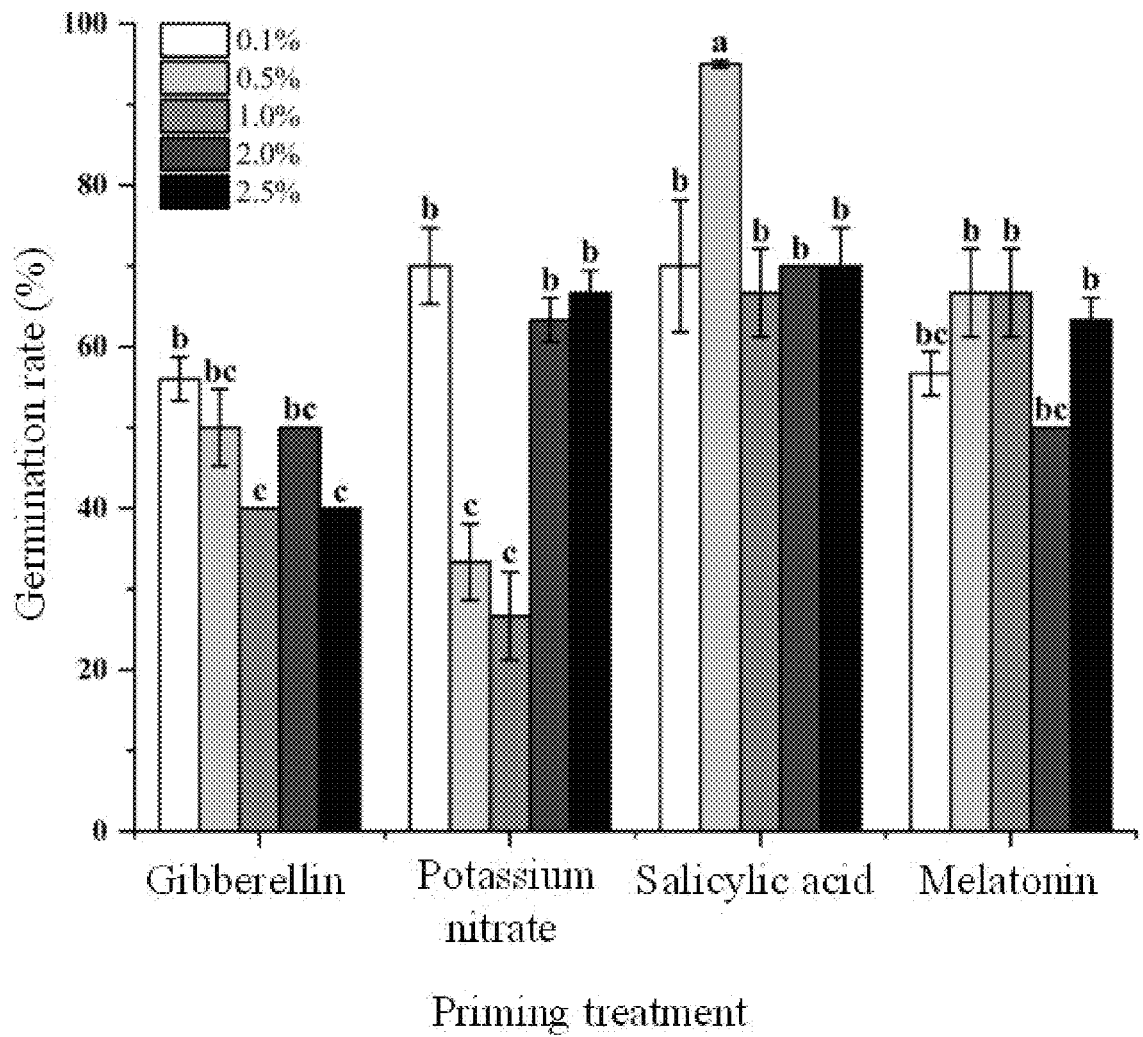
FIG. 2 shows the results of seed germination rate of *Euryale ferox* under different priming treatments according to the Embodiment 3. Different lowercase letters represent the significant difference of the number and volume germination rate at the level of 0.05 under different saline-alkali and hydrological conditions.

FIG. 1 shows the results of germination rate of *Euryale ferox* seeds under different priming treatments. It can be seen that the germination rate of *Euryale ferox* seeds treated with 0.5% salicylic acid solution is the best.

S3, controlling sowing of the *Euryale ferox* seeds

On May 11, 2023, the pretreated *Euryale ferox* seeds were soaked in 32° C. warm water for 10 days in a 24-hour light environment, and the water body was changed every two days during the soaking to prevent the *Euryale ferox* seeds from mildewing. Sowing is carried out evenly in the target plot with a density of 50 seeds/m$^2$, and keep the exposed part of *Euryale ferox* seeds downward. Natural wetland water was introduced to make the surface water depth of the target plot reach 10-15 cm before the seedlings of *Euryale ferox* grow to a height of 10 cm, and the surface water depth of the target plot was kept at 70-80 cm during the extension of the petiole and floating leaf of *Euryale ferox* and fruit ripening.

S4, germplasm improvement and ecological conservation

On Sep. 30, 2023, some *Euryale ferox* seeds in the target plot were collected, and the accumulated water was pumped away by a water pump, leaving the surface water depth to 10-20 cm. After the floating skin of the collected *Euryale ferox* fruits was removed, 10% of the *Euryale ferox* seeds were reserved for germplasm improvement for the next year's *Euryale ferox* cultivation. The ploughing machine is used to enter the target plot to turn the *Euryale ferox* stems and the soil with a depth of 30 cm at the bottom, thus improving the physical environment of the basement, speeding up nutrient input and promoting its near-natural recovery.

The method proposed in the above embodiment has clear principle, easy implementation and low cost. The method proposed based on the above embodiment does not need frequent manual maintenance after rebuilding the returned farmland to breed economic crops. Moreover, the method proposed in the above embodiment may harvest *Euryale ferox* seeds and produce natural breeding provenances in the same year, which is suitable for popularization and application in the project of returned farmland to wetland and the development of wetland eco-economic industry.

The disclosure may effectively improve the returned farmland to wetland efficiency and ecological function of the returned farmland. According to the disclosure, the returned farmland paddy field adjacent to the natural wetland is selected as the restoration target, so that the water resources of the natural wetland may be fully utilized and the frequency conversion of hydrological rhythm may be regulated in sections, thereby effectively improving the efficiency of returned farmland to wetland. In addition, the content of the disclosure covers key measures such as matrix transformation, hydrological regulation and control, species introduction, etc., and the key components of the wetland are constructed in an all-round way, which may effectively promote the near-natural restoration of the returned farmlands in the direction of the wetland ecosystem and significantly restore the component structure and ecological function.

The method provided by the disclosure may effectively improve the quality and development quantity of *Euryale ferox* germplasm. According to the disclosure, the germplasm of *Euryale ferox* is improved by low-temperature sand storage treatment and seed soaking priming, and combined with continuous seed soaking priming in warm water to promote the germination of *Euryale ferox* seeds, so that cell division of *Euryale ferox* seeds and the generation of phytochemicals-related synthetic enzymes and disease course-related proteins may be effectively promoted, thereby effectively improving the germplasm quality and germination quantity of *Euryale ferox*. In addition, according to the disclosure, different surface flooding depths are respectively set for the seed germination, seedling growth and adult plant development stages of *Euryale ferox*, which may effectively activate the expression of LEA gene and ethylene response factor TERF2 in the seedling stage, so as to realize the rapid development of *Euryale ferox* seedlings by promoting cell proliferation, and the low-oxygen escape strategy adopted in the adult plant development process will maintain the gas exchange between seedling tissues and aerobic environment, promote the rapid development of aboveground parts and the seed setting scale, thus effectively improving *Euryale ferox* seeds.

The disclosure is safe and effective, and gives consideration to the ecological and economic benefits of wetlands. The *Euryale ferox* seed materials used in the disclosure all belong to common species in swamp wetlands and are taken from the natural wetland environment around the restoration site, so there is no risk of invasion of exotic species. Meanwhile, the wetland plants selected in the disclosure belong to economic crops, and the economic benefits are considerable by breeding *Euryale ferox* according to the patent method.

It can be understood by those skilled in the art that the features recited in various embodiments and/or claims of the present disclosure may be combined or combined in various ways, even if such combinations or combinations are not explicitly recited in the present disclosure. In particular, various embodiments of the present disclosure may be combined in various ways without departing from the spirit and teaching of the present disclosure. All these combinations fall within the scope of this disclosure.

Although the preferred embodiments of the present disclosure have been described, those skilled in the art may make additional changes and modifications to these embodiments once they know the basic creative concepts. Therefore, the appended claims are intended to be interpreted as including the preferred embodiment and all changes and modifications that fall within the scope of the present disclosure. Obviously, those skilled in the art may make various modifications and variations to the disclosure without departing from the spirit and scope of the disclosure. Thus, it is intended that the present disclosure include these modifications and variations provided that they are within the scope of the claims and the equivalents.

What is claimed is:

1. A method for breeding of economic crops in a wetland by using a returned farmland, comprising:
    selecting a site of the returned farmland and restoring a landform (S1);
    selecting a returned farmland paddy field adjacent to a natural wetland as a restoration plot, excavating a soil layer of the restoration plot, and piling a ridge on a peripheral edge of the restoration plot (S11);
    loosening a soil in a middle part of the restoration plot, and adding reed crushed matrix into the restoration plot and fully mixing with a loosened soil layer (S12);
    excavating a V-shaped water delivery ditch with a ditch depth of 50-70 centimeters in the restoration plot, and reserving water delivery outlets of 1-2 meters in a staggered way on the ridge adjacent to the water delivery ditch (S13); and
    planting reed rhizomes at a slope of the water delivery ditch (S14);
    performing germplasm improvement treatment of *Euryale ferox* by obtaining mature *Euryale ferox* seeds, and sequentially performing disinfection, low-temperature sand storage and seed soaking priming treatment on the mature *Euryale ferox* seeds (S2);
    controlling sowing of the *Euryale ferox* seeds by soaking the *Euryale ferox* seeds after the germplasm improvement treatment in a water body at 31-35° C. in a continuous illumination environment for 5-10 days; evenly sowing the *Euryale ferox* seeds that have undergone germplasm improvement treatment in the restoration plot, and keeping a seed coat break for downward cultivation; wherein a soil moisture content is kept at 90-100% at an initial stage of cultivation, and a depth of surface water accumulation is kept at 10-15 centimeters during a seedling development stage, and a depth of the surface water accumulation is kept at 70-80 centimeters during an adult plant development stage (S3); and
    performing the germplasm improvement and ecological conservation by collecting a portion of each of the *Euryale ferox* seeds, wherein 5% of the *Euryale ferox* seeds developed in a current year are reserved for near-natural sexual breeding in the restoration plot, and 10% of collected *Euryale ferox* seeds are subjected to the germplasm improvement treatment; pumping out a water body in the restoration plot to a surface water depth of 10-20 centimeters, and mixing *Euryale ferox* stems with a soil with a depth of 30-40 centimeters (S4).

2. The method for the breeding of the economic crops in the wetland by using the returned farmlands according to claim 1, wherein the returned farmland paddy field adjacent to the natural wetland is a returned farmland paddy field 10-20 meters away from an edge of a water surface of the natural wetland.

3. The method for the breeding of the economic crops in the wetland by using the returned farmlands according to claim 1, wherein contents of sodium chloride and sodium bicarbonate in a soil of the returned farmland paddy field are all lower than 30 mmol/L.

4. The method for the breeding of the economic crops in the wetland by using the returned farmlands according to claim 1, wherein the soil layer of the restoration plot is excavated to a excavating depth of 50-70 centimeters; and a height of the ridge is 30-50 centimeters.

5. The method for the breeding of the economic crops in the wetland by using the returned farmlands according to claim 1, wherein a mass of the reed crushed matrix added in the restoration plot is 20-30 kilograms.

6. The method for the breeding of the economic crops in the wetland by using the returned farmlands according to claim 1, wherein a planting density of the reed rhizomes is 2-5 plants/m$^2$.

7. The method for the breeding of the economic crops in the wetland by using the returned farmlands according to claim 1, wherein in the S3, a sowing density is 45-60 seeds/m$^2$.

* * * * *